UNITED STATES PATENT OFFICE.

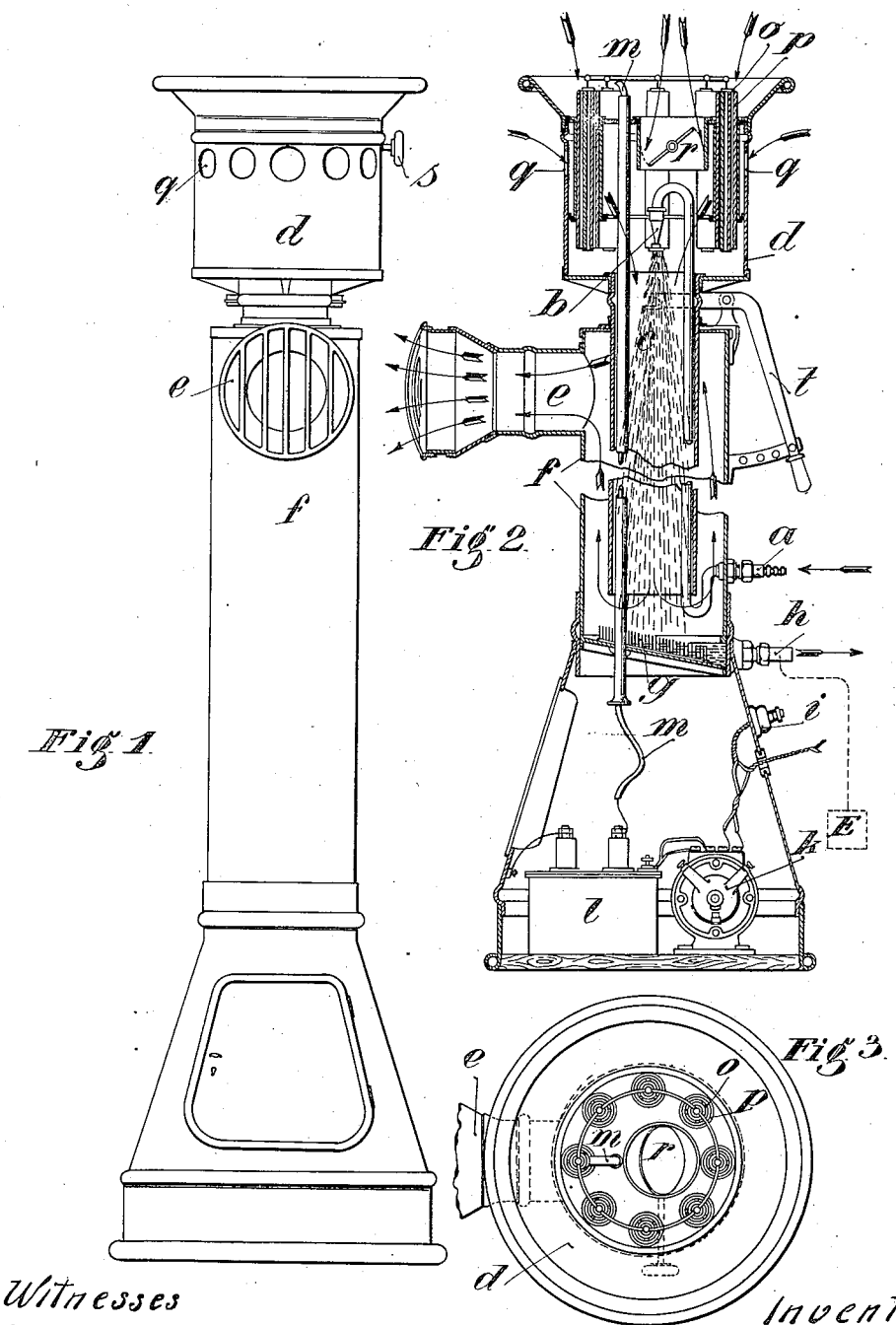

HUGO MESTERN, OF BERLIN, GERMANY.

DEVICE FOR THE PRODUCTION OF PURE AIR.

1,054,589.  Specification of Letters Patent.  Patented Feb. 25, 1913.

Application filed July 5, 1911. Serial No. 636,945.

*To all whom it may concern:*

Be it known that I, HUGO MESTERN, a subject of the German Emperor, and residing at Berlin, Germany, have invented certain new and useful Improvements in Devices for the Production of Pure Air, of which the following is a specification.

This invention has reference to a device for producing pure, hygienically moist air, rich in ozone. Furthermore hot air passing through the apparatus is cooled.

The essential features of the invention consist in mixing a current of ozonized air with outside untreated air drawn into a casing by means of a jet of water, whereby the so mixed air is moistened, washed and cooled, rendering the air rich in ozone. The pure ozonized air thus produced is expelled from the apparatus under high pressure.

Dry air has heretofore been ozonized but has the disadvantage that the air does not retain the ozone for any length of time; whereas the ozonized air moistened according to this invention retains the ozone for a much longer period. The water employed for drawing-in the air will also be ozonized on flowing through the apparatus and can therefore be advantageously employed for baths, as well as for softening, and de-ironizing water or the like.

The apparatus is particularly suitable for inhalation purposes, inasmuch as moist air rich in ozone very quickly gives considerable relief to asthmatic sufferers. For this purpose the apparatus is particularly suitable, because both the moisture as well as the proportion of ozone can be regulated by small graduations within wide limits, thus permitting of an absolutely individual treatment of the patients.

I will now describe my invention with reference to the accompanying drawing showing one form of construction of such an apparatus, in which:

Figure 1 shows the apparatus in front elevation. Fig. 2 is a vertical section. Fig. 3 is a plan view of the same.

As may be seen from Fig. 2 a water pipe *a* passes through the apparatus and is provided outside the casing of the apparatus with a connecting piece for the main water pipe, and at the other end inside the casing is provided with a spraying nozzle *b*. The spraying nozzle *b* is situated centrally above a tube *c* in which the sprayed water flows downward in the direction of the arrow.

The tube *c* is surmounted by a casing *d* in which the ozonizing apparatus is arranged. This apparatus consists of glass tubes *o* and *p* concentrically arranged in each other, so as to leave a free air gap between each other. The outer wall of the large glass tube *p* is provided with a metal jacketing, and the inner wall of the small glass tube is also lined with metal. Both metal coverings are electrically connected with each other, in the usual manner with ozone-generating tubes. The inner metal coverings are connected by a high-tension cable *m* with the one pole of a high-tension transformer *l* arranged in the lower portion of the apparatus. The outer metal coverings of the glass tubes are connected with each other and with the other pole of the high-tension transformer *l* by the earthed metal frame of the apparatus.

Air openings *q* are provided in the casing *d*. Furthermore a tubular body is provided above the nozzle *b* and can be more or less cut off by means of a damper *r*, provided with a handle *s*. The air is drawn in by the sprayed jet of water and flows in the direction of the arrow, through the apparatus and the ozonizing device *o* and *p*. The quantity of air flowing through the ozonizing device can be regulated by closing the damper *r* more or less, and in this way the ozonification of the air can be regulated. The tube *c* is vertically adjustable by means of a handle *t*. The amount of moisture absorbed by the air flowing through the tube *c* can be regulated by the position of the tube *c*. The water striking against the bottom of the apparatus falls on to a brush *g* or the like for the purpose of avoiding noise, and is then conducted to the outlet in the direction of the arrow.

As soon as the electric current is fed to the primary part *k* of the transformer and consequently the secondary part or high-tension transformer *l* fed with alternating current, electric discharges will take place between the concentric glass tubes *o* and *p*. The ozonized air mixes with the other air and passes together with it into the suction pipe *c*.

The electrical high-tension or high-tension frequency apparatus is arranged in the lower portion of the device. The suitably moistened ozonized air escapes from the apparatus in the direction of the arrow through the opening *e* which can be closed more or less by means of the valve.

The construction of the apparatus may be considerably modified without thereby deviating from the underlying principle of the invention. For example any suitable ozonizing device may be combined with the apparatus. The current necessary for ozonizing may be taken from any desired and suitable source. A very suitable, and at the same time simple and cheap arrangement, consists in connecting the apparatus up to the lighting line of a building, if necessary by arranging a resistance with a condenser, the terminals of which are connected with a primary circuit provided with an automatic cut-out. The condenser will thus be periodically charged and discharged and vary the normal voltage in the high-tension current which is thus directly suitable for the production of ozone. In this manner net-work currents may be employed which give direct current, as well as alternating current or triphase current.

Besides being employed for inhalation purposes the apparatus is very suitable for large rooms containing a great number of persons, for the purpose of constantly supplying these rooms with pure fresh and cooled air. It is also suitable for hospitals and the like, as well as for disinfecting. The arrangement may also be arranged in buildings in order to supply the various rooms with pure moist air rich in oxygen. For this purpose pipes connected to an apparatus of the present kind arranged at some suitable spot are passed through the building to the various rooms, so that only a tap or valve has to be opened in order to provide the rooms in question with fresh air. Finally it may be mentioned the apparatus also permits of obtaining warm ozone vapors, which are particularly suitable for inhalation. This is effected by connecting the apparatus $a$ to the hot water pipes.

I claim:

1. A process of purifying air which consists in mixing an air current of ozonized air with outside untreated air, then moistening and washing the so mixed air within a casing.

2. A process of purifying air which consists in ozonizing a current of air, and then mixing with a regulated current of atmospheric untreated air, and then moistening and washing the air so mixed.

3. A process of purifying air which consists in mixing an air current of ozonized air with outside untreated air, then subjecting said so mixed air to a jet of water within a restricted area, thereby forcing it with the water through said area, and then discharging the water through one outlet and the air through another.

4. A process of purifying air which consists in mixing an air current of ozonized air with outside untreated air, then moistening and washing the so mixed air within a casing, and then subjecting said air currents to the action of high tension currents of electricity during its subjection to the air in the water.

5. An apparatus for producing pure air comprising in combination with an ozonizer, a casing, and a water nozzle for drawing a current of air into said casing, thus moistening and washing and cooling the air and forcing it through said casing.

6. An apparatus for producing pure air comprising in combination with an ozonizer, a casing, a water nozzle for drawing a current of air into said casing and spraying it with water, means for supplying high tension electric currents to said casing for contact with said so treated air, and means for driving the so treated air out of the casing.

7. An apparatus for producing pure air comprising metal covered glass tubes concentrically arranged, a casing, means for producing and forcing a current of water through said casing and for drawing in a current of air, said tubes being arranged to provide for the passage of the air therethrough which is drawn in by the water, and means for regulating the quantity of air drawn in through said tubes.

8. An apparatus for producing pure air comprising metal covered glass tubes concentrically arranged, a casing, means for producing and forcing a current of water through said casing and for drawing in a current of air, said tubes being arranged to provide for the passage of the air therethrough which is drawn in by the water, and a damper for controlling the quantity of air flowing through said ozonizing tubes.

In testimony whereof, I affix my signature in the presence of two witnesses.

HUGO MESTERN.

Witnesses:
HENRY HASPER,
WOLDEMAR HAUPT.